A. A. MITCHELL.
ATTACHMENT FOR CULTIVATORS.
APPLICATION FILED MAY 16, 1911.
1,013,675.
Patented Jan. 2, 1912.
2 SHEETS—SHEET 1.
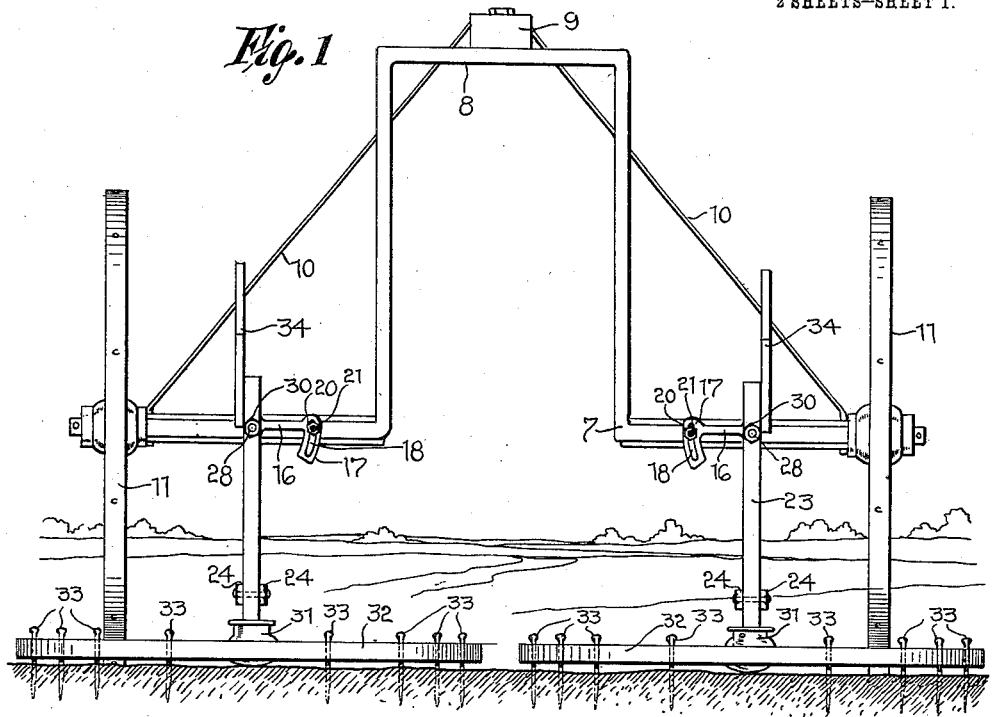
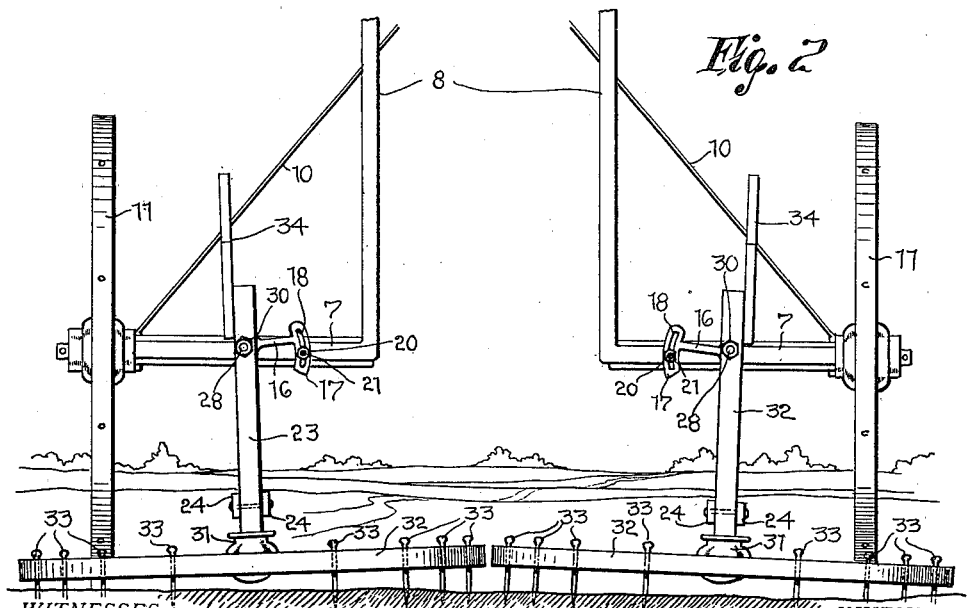
WITNESSES
Robert M. Sutphen
H. Joseph Doyle
INVENTOR
ABNER A. MITCHELL
By C. C. Vrooman, Attorney
COLUMBIA PLANOGRAPH CO., WASHINGTON, D. C.

A. A. MITCHELL.
ATTACHMENT FOR CULTIVATORS.
APPLICATION FILED MAY 16, 1911.
1,013,675.
Patented Jan. 2, 1912.
2 SHEETS—SHEET 2.
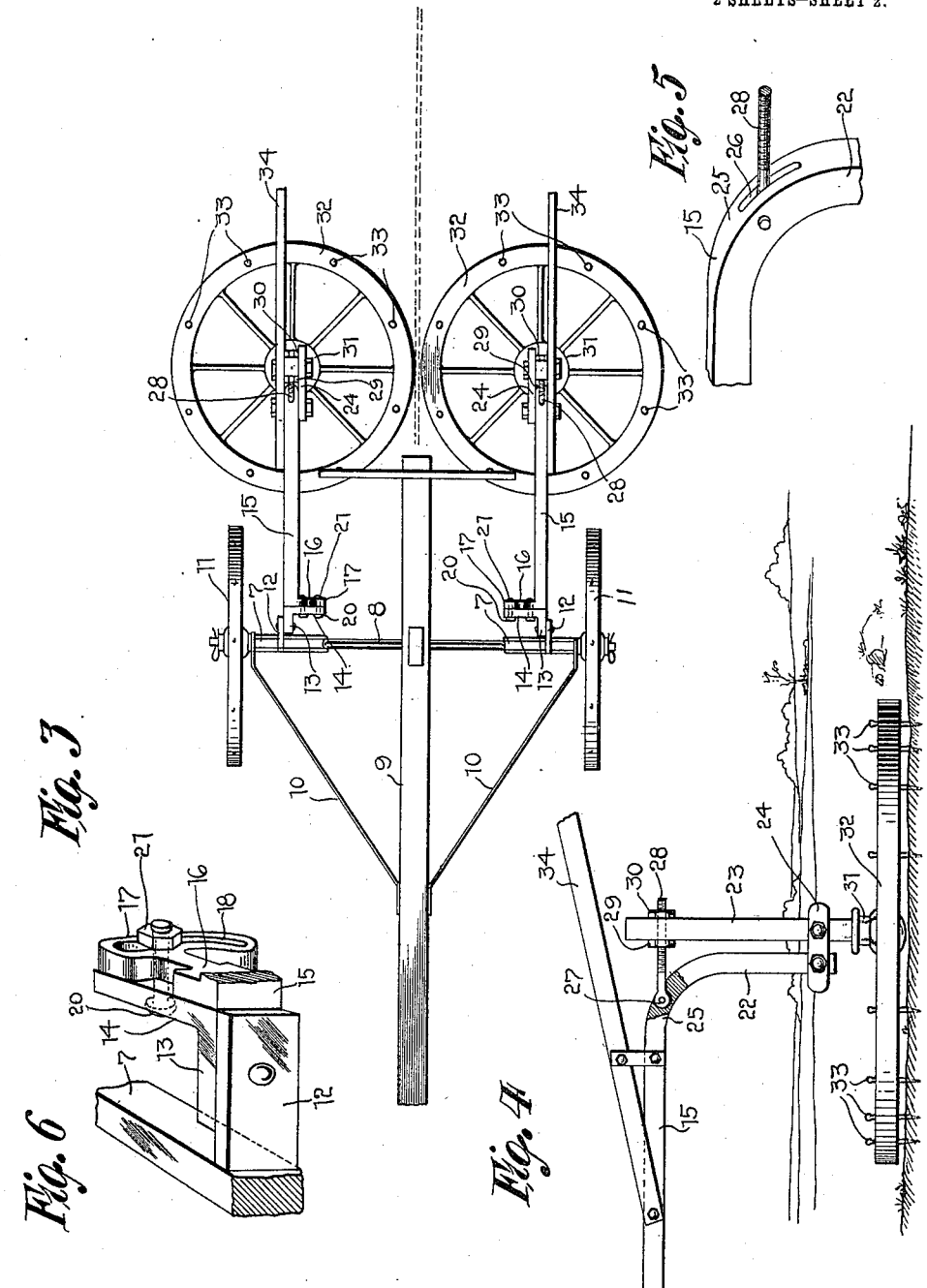
WITNESSES
Robert M. Sutphen
H. Joseph Doyle
INVENTOR
Abner A. Mitchell
By E. E. Thoom Attorney

UNITED STATES PATENT OFFICE.

ABNER A. MITCHELL, OF EARLETON, KANSAS.

ATTACHMENT FOR CULTIVATORS.

1,013,675.  Specification of Letters Patent.  Patented Jan. 2, 1912.

Application filed May 16, 1911. Serial No. 627,416.

*To all whom it may concern:*

Be it known that I, ABNER A. MITCHELL, citizen of the United States, residing at Earleton, in the county of Neosho and State of Kansas, have invented certain new and useful Improvements in Attachments for Cultivators, of which the following is a specification, reference being had therein to the accompanying drawing.

This invention relates to disk harrows and the principal object of the same is to provide novel means whereby the disks can be adjusted longitudinally and laterally relative to the harrow frame to facilitate effective operations upon the soil.

A preferred and practical embodiment of the invention is shown in the accompanying drawings, wherein:—

Figure 1 is a view in rear elevation of the improved harrows, the disks being adjusted for level work. Fig. 2 is a similar view, the disks being adjusted so that they will rotate by contact with the soil. Fig. 3 is a top plan view. Fig. 4 is a fragmentary view in side elevation showing the manner of adjustably connecting the disk standards to the beams. Fig. 5 is a fragmentary detail perspective view showing one of the beams and the adjusting bolt carried thereby. Fig. 6 is a detail perspective view showing the manner of adjustably connecting the beams to the axle.

The improved harrow comprises an axle 7 that is preferably provided with a central arch 8 upon which the tongue 9 is mounted, said tongue having brace connections 10 with opposite end portions of said axle 7. Wheels 11 are carried by the axle 7. Adjacent each wheel, the axle 7 has lateral lugs 12 projecting rearwardly therefrom to which the angular ends 13 of brackets 14 are pivotally connected.

Supporting beams 15 have inwardly projecting right angular forward end portions 16 pivotally connected to the brackets 14. The angular ends 16 of the beams 15 terminate in enlarged heads 17 that are provided with slots 18, curved on an arc concentric to the pivot openings of said angular ends 16 through which the bolt 20 passes. Bolts 20 extend transversely through the free ends of brackets 14 and the slots 18 of the heads 17. Nuts 21 are carried by bolts 20 for clamping engagement with the heads 17 to lock the beams 15 against pivotal movement relatively to said brackets. The beams 15, at their rear terminate in downturned end portions 22, and the disk standards 23 are pivotally connected thereto by the links 24. The shouldered rear portions 25 of the beams 15 are provided with slots 26 in which the flattened heads 27 of the adjusting bolts 28 are pivotally mounted. Bolts 28 extend transversely through the upper ends of standards 23 and carry adjusting and locking nuts 29 and 30 that engage opposite surfaces of said standards. The lower ends of standards 23 are journaled in the central upstanding bearings 31 of the horizontally arranged harrow wheels 32. Pulverizing teeth 33 extend through the rims of said harrow wheels. Handles 34 project rearwardly from the beams.

It will be seen from the foregoing that the pivotal connection of the brackets 14 with the axle lugs 12 permit the beams 15 to be raised vertically to lift the harrow wheels from the ground, and that the manner of pivotally connecting the angular ends 16 of said beams to the said brackets, permits said beams to be rotated to tilt the harrow wheels laterally relative to the beams. It will also be seen that the bolts 28 permit the standards to be adjusted toward or away from the rear ends of beams 15, thus tilting the harrow wheels longitudinally relatively to said beams. The bolts 20 and nuts 21 obviously provide means for locking the beams 15 in positions to retain the harrow wheels tilted laterally, and the bolts 28 and nuts 29 and 30 provide means for locking the standards 23 in positions to retain the harrow wheels tilted longitudinally.

As is shown in Fig. 1, the harrow wheels are in level positions and it will be clear that the harrow wheels will remain stationary relative to the beams 15, but when tilted, as is shown in Fig. 2, the strain on the teeth is uneven and thereby causes the harrow wheels to rotate.

What I claim as my invention is:—

1. A harrow comprising an axle, supporting wheels carried thereby, lugs projecting laterally from said axle, brackets pivotally connected to said lugs, supporting beams pivotally connected to said brackets, means for locking said beams to said brackets against relative movement, standards pivotally connected to said beams, harrow wheels rotatably connected to said standards, and adjusting means for locking said standards to said beams.

2. A harrow comprising an axle, supporting beams, means for connecting said beams to said axle to permit said beams to be adjusted vertically and rotated relative to said axle, standards pivotally connected to said beams, means for adjusting said standards relative to said beams, and harrow wheels carried by said standards.

3. A harrow comprising a portable support, beams, means for connecting said beams to the support to permit vertical and rotary adjustments of said beams relative to the said support, standards pivotally connected to said beams, means for adjusting said standards pivotally relative to said beams and harrow wheels journaled to said standards.

4. A harrow comprising a portable support, brackets pivotally connected thereto, supporting beams having angular end portions pivotally connected to said brackets, said angular portions terminating in heads provided with curved slots that are concentric relative to the pivotal points of the angular ends and brackets, locking means carried by the brackets and engaging said slots, standards adjustably connected to said beams, and harrow wheels carried by said standards.

5. A harrow comprising a portable support, beams, means for adjustably connecting the beams to said support, said beams having pendent rear portions, standards, means for pivotally connecting the lower portions of the standards to the lower portions of the pendent rear end portions of the beams, an adjusting bolt connecting the upper portions of said standards to the upper portions of the rear of said beams, and harrow wheels carried by said standards.

In testimony whereof I hereunto affix my signature in presence of two witnesses.

ABNER A. MITCHELL.

Witnesses:
C. F. Trowbridge,
G. W. Riley.

---

Copies of this patent may be obtained for five cents each, by addressing the "Commissioner of Patents, Washington, D. C."